(12) United States Patent
Salter et al.

(10) Patent No.: US 11,573,102 B2
(45) Date of Patent: Feb. 7, 2023

(54) METHOD OF MANUFACTURING MULTI-LAYER ELECTRODE FOR A CAPACITIVE PRESSURE SENSOR AND MULTI-LAYER ELECTRODES FORMED THEREFROM

(71) Applicant: Ford Global Technologies, LLC, Dearborn, MI (US)

(72) Inventors: Stuart C. Salter, White Lake, MI (US); Pietro Buttolo, Dearborn Heighls, MI (US); Paul Kenneth Dellock, Northville, MI (US); Richard Gall, Ann Arbor, MI (US); Jim Robert Chascsa, Farmington Hills, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 260 days.

(21) Appl. No.: 16/950,547

(22) Filed: Nov. 17, 2020

(65) Prior Publication Data
US 2022/0155107 A1 May 19, 2022

(51) Int. Cl.
*G01D 5/24* (2006.01)
*G01L 9/00* (2006.01)
*C08L 75/08* (2006.01)
*G01L 9/12* (2006.01)
*C01B 32/158* (2017.01)

(52) U.S. Cl.
CPC ............ *G01D 5/2405* (2013.01); *C08L 75/08* (2013.01); *G01L 9/0072* (2013.01); *G01L 9/12* (2013.01); *C01B 32/158* (2017.08)

(58) Field of Classification Search
CPC ....... G01D 5/2405; C08L 75/08; C08L 75/04; G01L 9/0072; G01L 9/12; G01L 1/14; C01B 32/158; C08G 2110/00; C09D 11/52
USPC .......................... 324/662, 661, 658, 649, 600
See application file for complete search history.

(56) References Cited

U.S. PATENT DOCUMENTS 7,368,921 B2  5/2008 Deangelis et al.
10,297,741 B1  5/2019 Benedict et al.
11,193,808 B2 * 12/2021 Zorzetto ............... G01F 23/265
(Continued)

FOREIGN PATENT DOCUMENTS

WO     2015040801     3/2015
WO     2018050827     3/2018

*Primary Examiner* — Giovanni Astacio-Oquendo
(74) *Attorney, Agent, or Firm* — Burris Law, PLLC

(57) ABSTRACT

A multi-layer electrode of a capacitive pressure sensor is manufactured by roll to roll printing a conductive layer onto a polymer layer and forming a mutual capacitance sensor layer of the capacitive pressure sensor, co-extruding a conductive polymer layer and a foam dielectric layer and forming a coextruded layer of the capacitive pressure sensor, and pressure rolling the mutual capacitance sensor layer and the coextruded layer together and forming the multi-layer electrode. The conductive polymer layer includes between about 2 wt. % to about 15 wt. % graphene and between about 0.01 wt. % and 5 wt. % of the carbon nanotubes. Also, the conductive polymer layer has a flexural modulus equal to or greater than 5,000 MPa and an electrical resistivity less than or equal to 10 Ohm/mm$^3$, and the polymer layer and/or the conductive polymer layer is formed from recycled polyethylene terephthalate.

20 Claims, 3 Drawing Sheets

(56) References Cited

U.S. PATENT DOCUMENTS

2019/0287892 A1* 9/2019 Seääski .............. H01L 25/0657
2020/0229295 A1* 7/2020 Keränen ................ H05K 1/181

* cited by examiner

METHOD OF MANUFACTURING MULTI-LAYER ELECTRODE FOR A CAPACITIVE PRESSURE SENSOR AND MULTI-LAYER ELECTRODES FORMED THEREFROM

FIELD

The present disclosure relates to manufacturing multi-layer electrodes and particularly to low cost manufacturing multi-layer electrodes.

BACKGROUND

The statements in this section merely provide background information related to the present disclosure and may not constitute prior art.

Electrical switches are commonly used to "turn on", "turn off", and/or regulate functions and operations of machines. For example, switches for radio control, audio volume control, heating and/or air conditioning control, cruise control, among others, are typically included and placed or located on a steering wheel of a vehicle such that a driver can reach the switches without removing their hands from the steering wheel. In addition, some, if not most, of the electronic switches are pressure activated, i.e., are activated by pressure applied by the driver.

The present disclosure addresses issues related to pressure activated switches and other issues related to manufacturing of pressure activated switches.

SUMMARY

This section provides a general summary of the disclosure and is not a comprehensive disclosure of its full scope or all of its features.

In one form of the present disclosure, a multi-layer electrode for a capacitive pressure sensor is manufactured by roll to roll printing a conductive layer onto a polymer layer and forming a mutual capacitance sensor layer, co-extruding a conductive polymer layer and a foam dielectric layer and forming a coextruded layer, and pressure rolling the mutual capacitance sensor layer and the coextruded layer together and forming the multi-layer electrode.

In some variations, the roll to roll printing is rotogravure printing of conductive ink onto the polymer layer to form the conductive layer. Non-limiting examples of the conductive ink include silver inks, copper inks, carbon nanotube inks, carbon/graphene inks, and conductive polymer inks, among others. And in at least one variation, the conductive ink layer has a thickness between about 5 micrometers (μm) and about 100 μm, for example, between about 5 μm and about 50 μm, between about 7.5 μm and about 30 μm, or between about 10 μm and about 20 μm.

In some variations, the conductive polymer layer includes polyethylene terephthalate (PET), and in at least one variation the PET is recycled PET. For example, the PET is from recycled PET beverage containers.

In some variations, the conductive polymer layer includes a filler. In such variations the filler can be at least one of graphene and carbon nanostructures such as carbon nanotubes. For example, in at least one variation the conductive polymer layer includes between about 2 wt. % to about 15 wt. % graphene and between about 0.01 wt. % and 5 wt. % carbon nanotubes.

In some variations, the conductive polymer layer has a flexural modulus equal to or greater than 5,000 MPa. In the alternative, or in addition to, the conductive polymer layer has an electrical resistivity less than or equal to 10 Ohm/mm$^3$. In at least one variation, the conductive polymer layer includes between about 2 wt. % to about 15 wt. % graphene, between about 0.01 wt. % to about 5 wt. % carbon nanotubes, a flexural modulus equal to or greater than 5,000 MPa, and an electrical resistivity less than or equal to 10 Ohm/mm$^3$. And in some variations, the graphene content is between about 8 wt. % to about 10 wt. % and the carbon nanotubes content is between about 0.01 wt. % and 1 wt. %.

In another form of the present disclosure, a multi-layer electrode for a capacitive pressure sensor is manufactured by roll to roll rotogravure printing a conductive ink layer onto a polymer layer to form a mutual capacitance sensor layer, co-extruding a conductive polymer layer and a foam dielectric layer form a coextruded layer, and pressure rolling the mutual capacitance sensor layer and the coextruded layer together such that the dielectric foam layer is in contact with the conductive ink layer to form the multi-layer electrode. In some variations, the conductive polymer layer includes between about 2 wt. % to about 15 wt. % graphene and between about 0.01 wt. % and 5 wt. % carbon nanotubes. In the alternative, or in addition to, the conductive polymer layer has a flexural modulus equal to or greater than 5,000 MPa and an electrical resistivity less than or equal to 10 Ohm/mm$^3$.

In still yet another form of the present disclosure, a multi-layer electrode for a capacitive pressure sensor is manufactured according to a method that includes roll to roll rotogravure printing a conductive ink layer onto a polymer layer and forming a mutual capacitance sensor layer of the multi-layer electrode, co-extruding a conductive polymer layer and a foam dielectric layer and forming a coextruded layer of the multi-layer electrode, and pressure rolling the mutual capacitance sensor layer and the coextruded layer together and forming the multi-layer electrode. The conductive polymer layer includes between about 2 wt. % to about 15 wt. % of graphene and between about 0.01 wt. % and 5 wt. % of carbon nanotubes. Also, the dielectric foam layer is in contact with the conductive ink layer. In some variations, the conductive polymer layer has a flexural modulus equal to or greater than 5,000 MPa and an electrical resistivity less than or equal to 10 Ohm/mm$^3$.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which.

Figure 1:
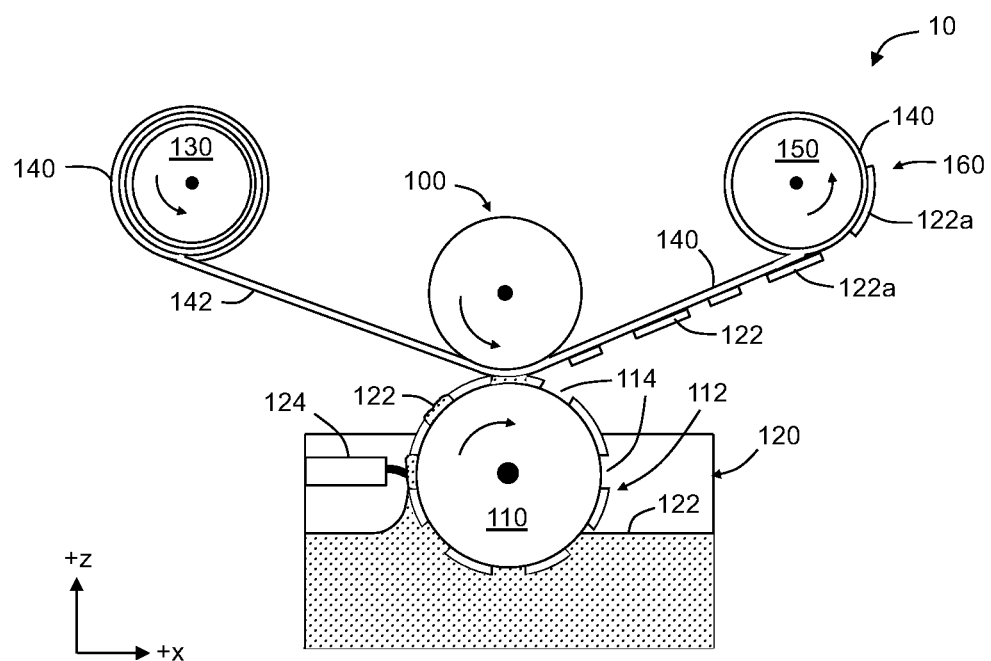
FIG. 1 is side view of a roll to roll printer forming a mutual capacitance sensor layer of a multi-layer electrode according to the teachings of the present disclosure.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

Referring to FIG. 1, a step for manufacturing a multi-layer electrode for a capacitive pressure sensor using a printer 10 is shown. The printer 10 includes a first roller 100, a second roller 110 and an ink container 120 with an electrically conductive ink 122 (referred to herein simply as "conductive ink"). In some variations of the present disclosure, the printer 10 is a rotogravure printer 10, the first roller 100 is an impression roller 100, and the second roller 110 is a plate cylinder 110 with a plate 112 having cells 114. As shown in FIG. 1, the plate cylinder 110 rotates such that the cells 114 pass through and are filled with the conductive ink 122, and then come into contact with a print surface 142 of a polymer film (layer) 140 moving between the impression roller 100 and the plate 112 such that the conductive ink 122 is transferred to the print surface 142. In at least one variation, a wiper 124 (also known as a doctor blade) is included and removes excess conductive ink 122 from the plate 112 and the cells 114 before the cells 114 reach the polymer layer 140.

Figure 2:
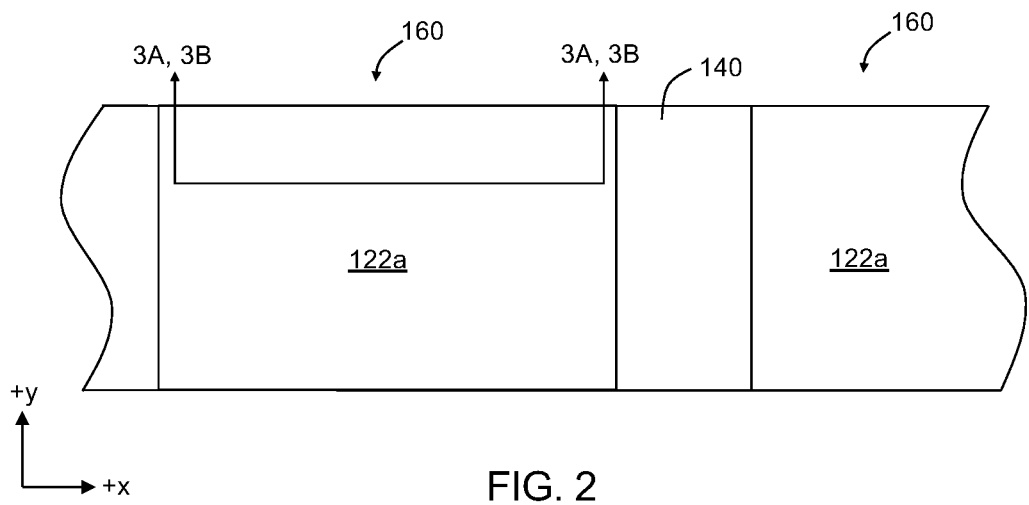
FIG. 2 is a top view of the mutual capacitance sensor layer formed in FIG. 1 with a conductive ink layer printed on a polymer layer.

In some variations, the polymer layer 140 is provided from a feed roller 130 and then gathered or rolled onto a take-up roller 150. That is, in some variations the printer 10 is a roll to roll printer. In addition, the conductive ink 122 dries and forms a plurality of conductive ink layers 122a on the polymer layer 140 before and/or during being rolled onto the take-up roller 150. The sections or areas of the polymer layer 140 with the conductive ink layers 122a form a plurality of mutual capacitance sensor layers 160 (FIG. 2) of a multi-layer electrode described in greater detail below. As used herein, the term or phrase "mutual capacitance sensor layer" refers to a capacitance sensor layer with a planar construction such that the electrodes and traces for the sensor layer are fabricated on the same plane of insulating substrate material.

Non-limiting examples of the polymer layer 140 include polymer layers (e.g., polymer sheet or film) made from polyethylene (PE), polyethylene terephthalate (PET), polytetrafluoroethylene (PTFE), and polyvinyl chloride (PVC), polypropylene (PP), polyamide (PA), among others. In some variations the polymer layer 140 is made from recycled polymer material(s). Also, in some variations the polymer layer 140 has a thickness between about 0.25 mm to about 10 mm, for example between about 0.4 mm to about 7.5 mm, or between about 0.5 mm to about 6 mm.

Also, non-limiting examples of conductive ink 122 include silver inks, nano-silver inks, copper inks, carbon nanotube inks, carbon/graphene inks, indium tin oxide (ITO) inks, and conductive polymer inks, among others. In some variations the conductive ink includes a solvent and/or such as but not limited to ethanol, an ethyl solvent, methanol, a methyl solvent, among others. And in at least one variation, the conductive ink layer has a thickness between about 5 micrometers (μm) and about 100 μm, for example, between about 5 μm and about 50 μm, between about 7.5 μm and about 30 μm, or between about 10 μm and about 20 μm.

Figure 3A:
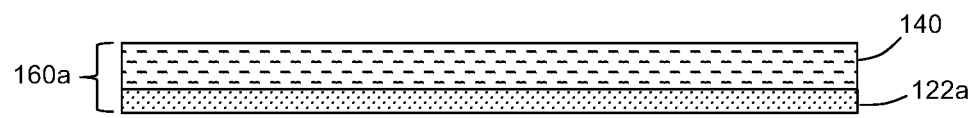
FIG. 3A is a view of section 3A-3A in FIG. 2.
Figure 3B:
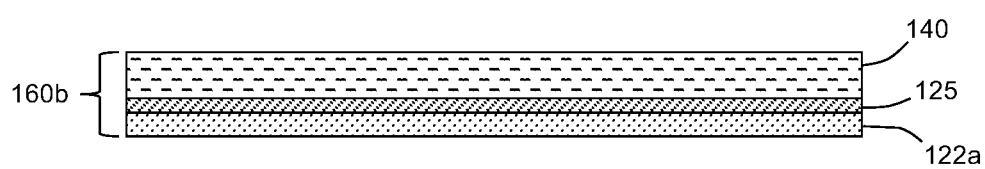
FIG. 3B is a view of section 3B-3B in FIG. 2.

Referring to FIGS. 3A-3B, in some variations the conductive ink layer 122a is disposed directly onto the polymer layer 140 to form a mutual capacitance sensor layer 160a as shown in FIG. 3A, while in other variations at least one additional layer 125 (referred to hereafter simply as "additional layer 125") is disposed between the conductive ink layer 122a and the polymer layer 140 as shown in FIG. 3B. For example, in some variations the polymer layer 140 is a transparent or translucent polymer layer and the additional layer 125 is one or more decorative layers (e.g., an additional ink layer(s)) such that an image or color is visible through the polymer layer 140 (e.g., when viewing from the −z direction).

Figure 4:
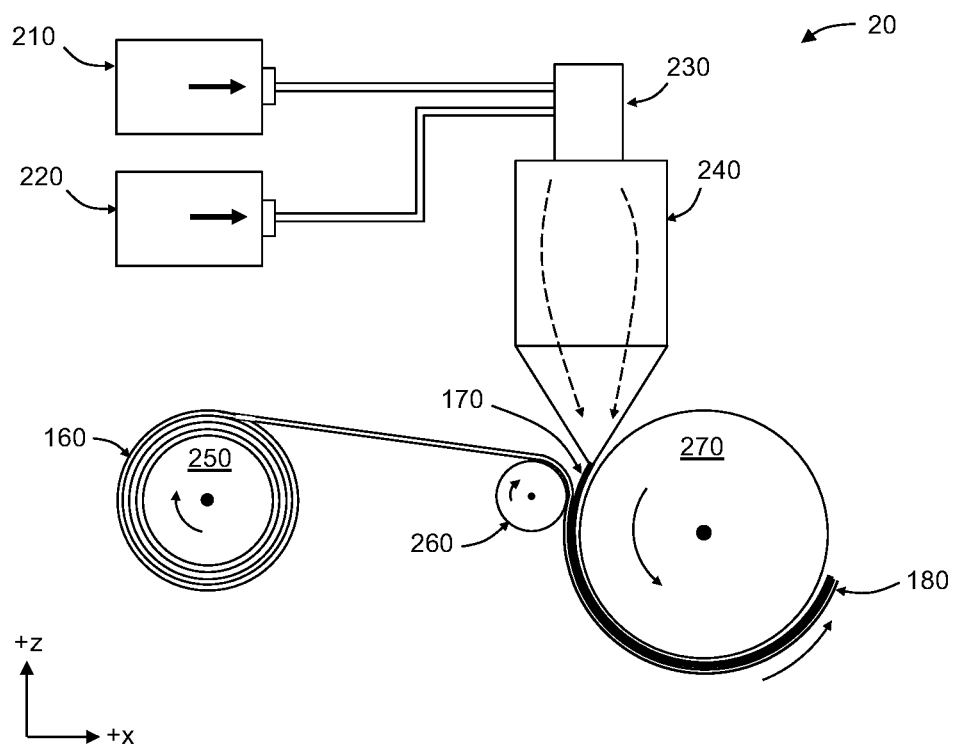
FIG. 4 is a side view of a co-extrusion machine and a press roller forming a multi-layer electrode according to the teachings of the present disclosure.

Referring to FIG. 4, another step for manufacturing the multi-layer electrode is shown where a co-extrusion machine 20 with a first extruder 210 and a second extruder 220 is used to form a co-extruded layer 170 with a conductive polymer layer 172 (FIGS. 5A-5B) and a dielectric layer 174. In some variations, the first extruder 210 is configured to extrude the conductive polymer layer 172 (FIGS. 5A-5B) and the second extruder 220 is configured to extrude the dielectric layer 174. In other variations, the first extruder 210 is configured to extrude dielectric layer 174 and the second extruder 220 configured to extrude the conductive polymer layer 172. And in some variations, the dielectric layer 174 is a foam dielectric layer.

As shown in FIG. 4, the first extruder 210 extrudes material for the conductive polymer layer 172 and the second extruder 220 extrudes material for the dielectric layer 174 to a multi-manifold 230 and through a T-die 240 to form the co-extruded layer 170. It should be understood that the extrusion temperature or range of extrusion temperatures for the conductive polymer layer 172 and the dielectric layer 174 will vary and be a function of material supplier recommendations and/or melting temperature of the material. In addition the extrusion temperature can vary throughout the various zones of the first extruder 210 and the second extruder 220. For example, in one non-limiting example the first extruder 210 and the second extruder 220 (referred to herein collectively as "extruders 210, 220") each have a rear zone (not shown) where material is dropped into the extruders 210, 220, one or more middle zones (not shown) where material is melted and mixes, a front zone (not shown) where temperature of the melted material is stabilized, and an extension and die (not shown) where the co-extruded layer 170 is formed. For example, for materials such as ethylene-vinyl acetate (EVA) with a desired melting temperature of 205° F. (96° C.), an extruder or co-extruder could have a rear zone with a desired temperature of 90° F. (32° C.), a first middle zone with a desired temperature of 150° F. (66° C.), a second middle zone with a desired temperature of 205° F. (96° C.), and a front zone, extension and die with a desired temperature of 205° F. (96° C.). And for materials such as polyethylene terephthalate (PET) with a desired melting temperature of 482° F. (250° C.), an extruder or co-extruder could have a rear zone with a desired temperature of 500° F. (260° C.), a first and second middle zone with a desired temperature of 518° F. (270° C.), a front zone with a desired temperature of 536° F. (280° C.), and an extension and die with a desired temperature of 554° F. (290° C.).

In some variations the conductive polymer layer 172 has a thickness between about 0.2 mm to about 10.0 mm, for example between about 0.3 mm to about 6.0 mm, between 0.5 mm to about 2.5 mm, or between about 0.5 mm to about 1.0 mm.

In some variations the conductive polymer layer 172 includes one or more fillers. As used herein the term "filler" or "fillers" refers to particles, nanoparticles, fibers, nanotubes, among others that provide or enhance a physical, mechanical and/or chemical property of the conductive polymer layer 172. For example, in some variations the conductive polymer layer 172 can include a carbon filler to enhance the electrical and/or mechanical properties of the conductive polymer layer 172. Particularly, the conductive polymer layer 172 can include between about 2 weight percent (wt. %) to about 15 wt. % of graphene. In the alternative, or in addition to, the conductive polymer layer 172 can include between about 0.01 wt. % to about 5 wt. % carbon nanotubes. In some variations, the conductive polymer layer 172 includes between about 8 wt. % to about 10 wt. % graphene and between about 0.01 wt. % to about 1.0 wt. % carbon nanotubes. One non-limiting example of the graphene is GrapheneBlack™ from Nano-xplore which is a low cost multi-layer graphene (6-10 layers) and one non-limiting example of the carbon nanotubes is ATHLOS™ Carbon Nanostructures (CNS) from Cabot.

Accordingly, the conductive polymer layer 172 has desired and tailored electrical properties. In addition, in some variations the conductive polymer layer 172 has desired mechanical properties. For example, in at least one variation the conductive polymer layer 172 has an electrical resistivity less than or equal to 10 Ohms per cubic millimeter (Ohm/mm$^3$) and in some variations the conductive polymer layer 172 has a flexural modulus equal to or greater than 5,000 megapascals (MPa). In at least one variation the conductive polymer layer 172 has an electrical resistivity less than or equal to 10 Ohm/mm$^3$ and a flexural modulus equal to or greater than 5,000 MPa.

In some variations the dielectric layer 174 is a dielectric foam layer with a thickness between about 0.2 mm to about 15 mm, for example between about 0.3 mm to about 13 mm, between about 0.4 mm to about 12.5 mm, or between about 0.5 mm to about 12 mm. Also, non-limiting examples of the dielectric layer 174 include dielectric layers formed from polyethylene, polyethylene foam, polyurethane, among others. In some variations, the dielectric layer 174 is formed from a foamed polymer such as but not limited to polypropylene (PP) foam, thermoplastic elastomer (TPE) foam, polyvinyl chloride (PVC) foam, thermoplastic polyurethane (TPU) foam, thermoplastic vulcanizate (TPV) foam, among others.

In some variations the co-extruded layer 170 is co-extruded onto a cooling roller 270. And in such variations the polymer layer 140 with the plurality of mutual capacitance sensor layers 160 on a supply roller 250 is press rolled onto the co-extruded layer 170 with a press roller 260 such that a plurality of multi-layer electrodes 180 are formed. In other variations, the first extruder 210 and the second extruder 220 extrude the co-extruder layer 170 onto a separate roller (not shown) for storage and/or additional processing before being press rolled onto the mutual capacitance sensor layer 160. In addition, in at least one variation an adhesive (not shown) is applied between the polymer layer 140 with the plurality of mutual capacitance sensor layers 160 and the co-extruded layer 170 before being press rolled together such that bonding or adhesion between the plurality of mutual capacitance sensor layers and the co-extruded layer 170 is enhanced.

It should be understood that the plurality of multi-layer electrodes 180 (i.e., the co-extruded layer 170 press rolled and bonded to the polymer layer 140 with the plurality of mutual capacitance sensor layers 160 bonded thereto) can be rolled onto another roller (not shown) for storage and/or further processing, cut into a plurality of sheets (not shown) comprising the plurality of multi-layer electrodes 180 for storage and/or further processing, and the like.

Figure 5A:
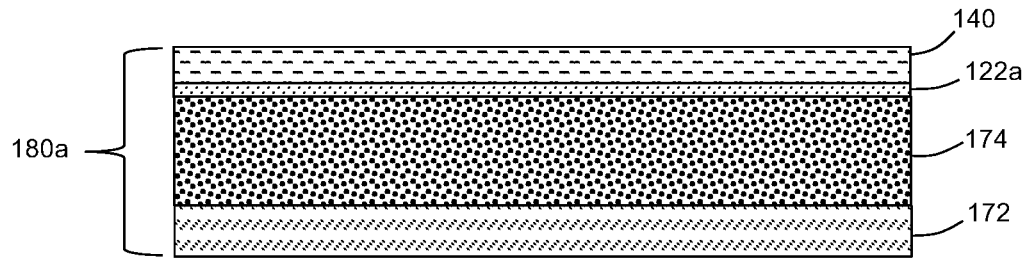
FIG. 5A is a side cross-sectional view of the multi-layer electrode in FIG. 4 according to one variation of the present disclosure.
Figure 5B:
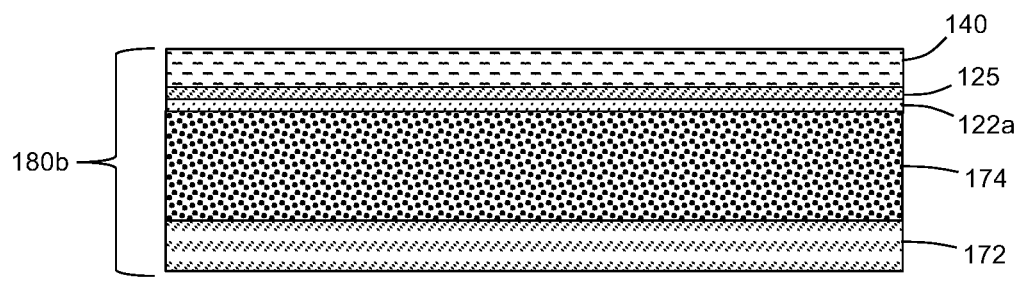
FIG. 5B is a side cross-sectional view of the multi-layer electrode in in FIG. 4 according to another variation of the present disclosure.

Referring to FIGS. 5A-5B, in some variations the co-extruded layer 170 is pressed rolled onto the mutual capacitance sensor layer 160a to form a multi-layer electrode 180a as shown in FIG. 5A, while in other variations the co-extruded layer 170 is pressed rolled onto the mutual capacitance sensor layer 160b to form a multi-layer electrode 180b (collectively referred to herein as "multi-layer electrodes 180") as shown on FIG. 5B. Also, and as shown in FIGS. 5A-5B, the dielectric layer 174 is rolled onto the conductive ink layer 122a such that the dielectric layer 174 is disposed between the conductive ink layer 122a and the conductive polymer layer 172. Accordingly, the multi-layer electrodes 180 are configured for use as or to be used as part of a pressure sensor.

For example, when the conductive ink layer 122a or the conductive polymer layer 172 are electrically connected to an energy source (e.g., a battery) a self-capacitance mode of the multi-layer electrode 180 is provided. In the alternative, when the conductive ink layer 122a and the conductive polymer layer 172 are electrically connected to an energy source a mutual-capacitance mode of the multi-layer electrode 180 is provided. In some variations the conductive ink layer 122a is a top or outer layer and serves as a ground electrode and the conductive polymer layer 172 is a bottom or inner layer and serves as an activated electrode. In such variations, pressure applied on the polymer layer 140 results in squeezing of compression of the dielectric layer 174 such that a capacitive field proportional to the applied pressure is created. In addition, the flexural modulus of the conductive polymer layer 172 provides a rigidity or stiffness for the multi-layer electrodes 180 such that normal or typical pressure from an individual's hand and fingers applied to the multi-layer electrodes 180 results in a desired capacitive field.

Figure 6:
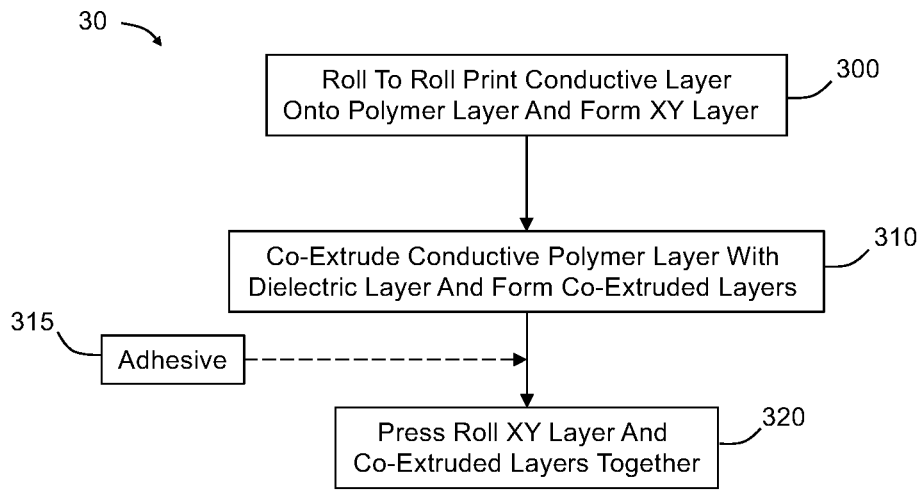
FIG. 6 is a flow chart of a method of forming a multi-layer electrode for a capacitive pressure sensor according to the teachings of the present disclosure.

Referring to FIG. 6, a method 30 of manufacturing the multi-layer electrode 180 is shown. The method 30 includes roll to roll printing a conductive ink layer onto a polymer layer and forming a mutual capacitance sensor layer at 300, co-extruding a conductive polymer layer and a dielectric layer and forming a co-extruded layer at 310, and press rolling the mutual capacitance sensor layer and the co-extruded layer together to form the multi-layer electrode at 320. In some variations, an adhesive (e.g., a spray adhesive) is applied between the mutual capacitance sensor layer and the co-extruded layer at 315 before press rolling at 320 such that adhesion between the mutual capacitance sensor layer and co-extruded layers is enhanced.

Unless otherwise expressly indicated herein, all numerical values indicating mechanical/thermal properties, compositional percentages, dimensions and/or tolerances, or other characteristics are to be understood as modified by the word "about" or "approximately" in describing the scope of the present disclosure. This modification is desired for various reasons including industrial practice, material, manufacturing, and assembly tolerances, and testing capability.

As used herein, the phrase at least one of A, B, and C should be construed to mean a logical (A OR B OR C), using a non-exclusive logical OR, and should not be construed to mean "at least one of A, at least one of B, and at least one of C."

The description of the disclosure is merely exemplary in nature and, thus, variations that do not depart from the substance of the disclosure are intended to be within the scope of the disclosure. Such variations are not to be regarded as a departure from the spirit and scope of the disclosure.

What is claimed is:

1. A multi-layer electrode of a capacitive pressure sensor manufactured according to a method comprising:
    roll to roll printing a conductive layer onto a polymer layer and forming an XY layer of the capacitive pressure sensor;
    co-extruding a conductive polymer layer and a foam dielectric layer and forming coextruded layers of the capacitive pressure sensor; and
    pressure rolling the XY layer and the coextruded layers together and forming the multi-layer electrode.

2. The multi-layer electrode according to claim 1, wherein the roll to roll printing comprises rotogravure printing conductive ink onto the polymer layer and forming the conductive layer.

3. The multi-layer electrode according to claim 2, wherein the conductive ink layer has a thickness between about 10 μm to about 100 μm.

4. The multi-layer electrode according to claim 2, wherein the conductive ink layer comprises at least one or silver, graphene, carbon, and indium tin oxide.

5. The multi-layer electrode according to claim 1, wherein the conductive polymer layer comprises polyethylene terephthalate (PET).

6. The multi-layer electrode according to claim 5, wherein the PET is recycled PET.

7. The multi-layer electrode according to claim 1, wherein the conductive polymer layer comprises a filler.

8. The multi-layer electrode according to claim 7, wherein the filler comprises graphene and carbon nanostructures.

9. The multi-layer electrode according to claim 8, wherein the carbon nanostructures comprise carbon nanotubes.

10. The multi-layer electrode according to claim 9, wherein the conductive polymer layer comprises between about 2 wt. % to about 15 wt. % of the graphene and between about 0.01 wt. % and 5 wt. % of the carbon nanotubes.

11. The multi-layer electrode according to claim 10, wherein the conductive polymer layer has a flexural modulus equal to or greater than 5,000 MPa.

12. The multi-layer electrode according to claim 10, wherein the conductive polymer layer has an electrical resistivity less than or equal to 10 Ohm/mm$^3$.

13. The multi-layer electrode according to claim 10, wherein the conductive polymer layer has a flexural modulus equal to or greater than 5,000 MPa and an electrical resistivity less than or equal to 10 Ohm/mm$^3$.

14. The multi-layer electrode according to claim 1, wherein the conductive polymer layer comprises between about 2 wt. % to about 15 wt. % of graphene, between about 0.01 wt. % and 5 wt. % of carbon nanotubes, a flexural modulus equal to or greater than 5,000 MPa and an electrical resistivity less than or equal to 10 Ohm/mm$^3$.

15. The multi-layer electrode according to claim 14, wherein the conductive polymer layer comprises between about 8 wt. % to about 10 wt. % of the graphene and between about 0.01 wt. % and 1 wt. % of the carbon nanotubes.

16. A multi-layer electrode for a capacitive pressure sensor manufactured according to a method comprising:
    roll to roll rotogravure printing a conductive ink layer onto a polymer layer and forming an XY layer of the multi-layer electrode;
    co-extruding a conductive polymer layer with a foam dielectric layer and forming coextruded layers of the multi-layer electrode; and
    pressure rolling the XY layer and the coextruded layers together and forming the multi-layer electrode, wherein the dielectric foam layer is in contact with the conductive ink layer.

17. The multi-layer electrode according to claim 16, wherein the conductive polymer layer comprises between about 2 wt. % to about 15 wt. % of graphene, between about 0.01 wt. % and 5 wt. % of carbon nanotubes.

18. The multi-layer electrode according to claim 17, wherein the conductive polymer layer has a flexural modulus equal to or greater than 5,000 MPa and an electrical resistivity less than or equal to 10 Ohm/mm$^3$.

19. A multi-layer electrode for a capacitive pressure sensor manufactured according to a method comprising:
    roll to roll rotogravure printing a conductive ink layer onto a polymer layer and forming an XY layer of the multi-layer electrode;
    co-extruding a conductive polymer layer with a foam dielectric layer and forming coextruded layers of the multi-layer electrode, wherein the polymer layer comprises between about 2 wt. % to about 15 wt. % of graphene, between about 0.01 wt. % and 5 wt. % of carbon nanotubes; and
    pressure rolling the XY layer and the coextruded layers together and forming the multi-layer electrode, wherein the dielectric foam layer is in contact with the conductive ink layer.

20. The multi-layer electrode according to claim 19, wherein the conductive polymer layer has a flexural modulus equal to or greater than 5,000 MPa and an electrical resistivity less than or equal to 10 Ohm/mm$^3$.

* * * * *